Aug. 7, 1945.   A. L. WILSON   2,381,092
SOLVENT EXTRACTION OF HYDROCARBONS
Filed June 10, 1941
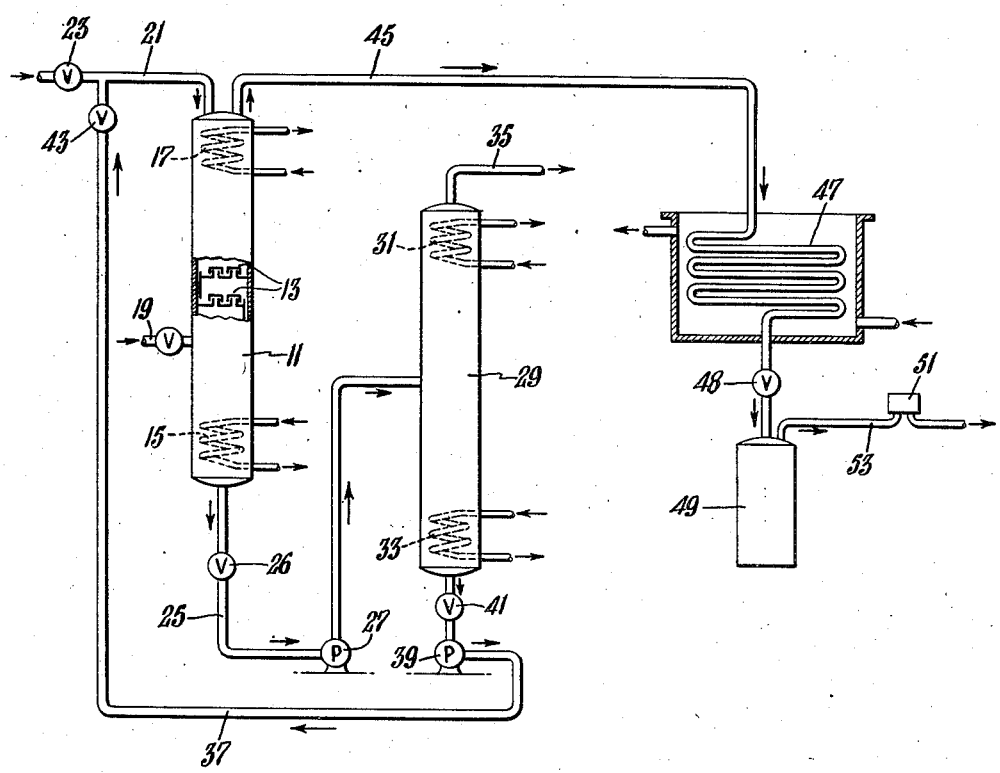
INVENTOR
ALEXANDER L. WILSON
BY
ATTORNEY Patented Aug. 7, 1945

2,381,092

UNITED STATES PATENT OFFICE 2,381,092

SOLVENT EXTRACTION OF HYDRO-
CARBONS

Alexander Logan Wilson, Sharpsburg, Pa., assignor to Carbide and Carbon Chemicals Corporation, a corporation of New York Application June 10, 1941, Serial No. 397,391

22 Claims. (Cl. 196—13)

This invention relates to the separation of and purification of paraffin, cycloparaffin, olefin, diolefin and aromatic hydrocarbons present in mixtures containing substances of two or more of these types. More especially it concerns the selective extraction of such hydrocarbon mixtures with a relatively high-boiling stable solvent which is liquid at the extraction temperature. The invention has especial utility for the selective extraction of petroleum distillates and other hydrocarbon mixtures in the vapor phase with a high-boiling heat-stable selective solvent for the aromatic and other unsaturated hydrocarbons.

One of the more important problems with which the petroleum industry is faced is the need for a simple and economical process for the separation of crude natural and artificial mixtures of hydrocarbons into fractions having certain desired properties. Common distillation processes effect a separation of the hydrocarbons on the basis of differences in vapor pressures, yielding mixtures of hydrocarbons of similar boiling points. In order to secure a more fundamental separation of the hydrocarbons on the basis of their respective structural configurations, attempts have heretofore been made, more or less successfully, to extract fractions of hydrocarbon distillates with various selective solvents for certain components of the distillate.

The separation of a hydrocarbon mixture into fractions respectively richer and poorer in olefines, diolefines and aromatic hydrocarbons has immense commercial importance. Hydrocarbon fractions of the type thus produced include high octane gasolines, high cetane Diesel fuels, highly aromatic or highly paraffinic industrial solvents, asphalt-free lubricating oils and white paraffin oils.

The principal object of the invention is to provide a novel and economical process for separating mixtures containing saturated hydrocarbons, such as paraffins and cycloparaffins, and/or unsaturated hydrocarbons of varying degrees of unsaturation, such as the aromatic hydrocarbons, olefines and diolefines.

In one form of the invention, this is accomplished by the distillation of the hydrocarbon mixture under such conditions that the hydrocarbon vapors flow countercurrent to the flow of a high-boiling liquid selective solvent. The latter has a boiling point higher than that of the hydrocarbons being extracted, and is preferably an organic sulfide having at least one aminoalkyl group directly connected with a sulfur atom, such as diaminoethyl sulfide.

By the aforesaid preferred procedure, applied to a hydrocarbon mixture of narrow boiling range, for example, one boiling within a range of 15° C., it is possible to produce substantially pure hydrocarbons such as toluene, benzene, hexane, styrene, and butadiene, by a commercially practicable procedure.

The selective solvents of the present invention are relatively high boiling; and are water-soluble or water-miscible. Consequently, hydrocarbons selectively dissolved by these solvents are readily separated from the resultant extract either by simple distillation of the hydrocarbons from the extract or by water extraction of the extract. The solvents possess high selectivity for unsaturated hydrocarbons in comparison with known compounds having similar physical properties.

Among open-chain aminoalkyl sulfides having outstanding value as extractants in the present process may be mentioned the diaminoalkyl sulfides, such as $\beta\beta'$ diaminoethyl sulfide; $\beta$ hydroxyethyl $\beta'$ aminoethyl sulfide; $\beta''$ aminoethyl ($\beta'$ iminoethyl) $\beta$ aminoethyl sulfide; and $\beta$ hydroxyisopropyl $\beta'$ aminoethyl sulfide. These solvents are sulfide derivatives of open-chain aliphatic hydrocarbons, generally having at least one $NH_2CH_2CH_2S-$ grouping. They may be defined as organic sulfides respectively having chemical structures designated by the formula $NH_2C_2H_4SR$, wherein R designates a group selected from the class consisting of the aminoalkyl groups, the hydroxyalkyl groups, and the aminoalkyl-substituted aminoalkyl groups. Those solvents having little or no aminoalkyl mercaptan content are preferred.

Hydrocarbon mixtures derived from the distillation or cracking of petroleum, or coal tar hydrocarbons, and particularly mixtures containing hydrocarbons which have between 4 and 10 carbon atoms to the molecule, are effectively treated by the process.

According to a preferred form of the invention, the vapors of a hydrocarbon mixture to be separated into components of different degrees of chemical unsaturation, or of different structural configurations, are passed into intimate countercurrent contact with a stream of a high-boiling liquid having at least one $NH_2CH_2CH_2S-$ group in the molecule. The extraction and separation may be carried out under atmospheric pressure, or at pressures above or below atmospheric. Preferably in performing the extraction the hydrocarbon mixture is vaporized—if not already in vapor form—and the vapors are passed into intimate contact with the liquid solvent within a rectifying column packed with the usual well-known contact means, such as Raschig rings, bell-cap plates, or glass spirals. A thorough extraction of the vapors by the liquid solvent thus is secured.

The unabsorbed or raffinate vapors pass overhead, and are withdrawn and condensed. The liquid extract passes through the lower section of the treating column to the kettle from which it may be removed continuously or intermittently. The solvent may be freed from the extract by any suitable method such as, for example, by distillation—or by cooling the extract, and then separating the layers formed during the cooling step.

Referring to the accompanying drawing wherein is illustrated a type of apparatus adapted for the practice of one form of the invention, numeral 11 designates a rectifying column which may be provided with a plurality of bell-cap plates 13, or may be filled with refractory contact means, such as Raschig rings, glass spirals, or the equivalent (not shown). The column 11 has a heating coil 15 in the base or kettle thereof, and a cooling coil 17 in the top thereof. The latter acts as a partial condenser for maintaining the desired reflux ratio. The feed line 19 serves to introduce hydrocarbon vapors, or volatile liquid hydrocarbons, to the midportion of the column 11 from a suitable source of supply. Suitable means (not shown) may be provided in line 19 for preheating the hydrocarbon mixture entering the column 11. Heating coil 15 maintains a suitable distillation temperature within the column 11. A supply of liquid selective solvent is introduced into the upper end of the column 11 through line 21, controlled by valve 23. Means (not shown) may be provided in line 21 for preheating the solvent entering the column 11. The solvent and extracted hydrocarbons flow downwardly in column 11 in countercurrent contact with rising hydrocarbon vapors; and the resultant extract is withdrawn from the column through line 25, controlled by valve 26, and is introduced by pump 27 into the midportion of a rectifying column 29, the latter of which may be provided with bell-cap plates or may be filled with contact material, similar to column 11. The column 29 has an upper cooling coil 31 and a lower heating coil 33 of well-known type. The extracted hydrocarbons are thus distilled from the solvent, and the former are removed through vapor line 35 condensed and recovered in suitable manner. The solvent is withdrawn continuously from the base of column 29, and is returned to solvent line 21 through conduit 37 provided with pump 39 and valves 41, 43.

The raffinate vapors leave column 11 through vapor line 45, and flow to a condenser 47 and thence past valve 48 to a storage tank 49. A means including a vacuum pump 51 and line 53 may be provided, if desired, for maintaining a vacuum in the extraction vessel 11.

The selective solvents of the present invention may be effectively used at temperatures at which the hydrocarbon mixtures being extracted are in liquid form, especially when the hydrocarbons being extracted boil within the range up to about 200° C. Temperatures around 20° to 25° C. conveniently may be used. Thus, at temperatures around 20°–30° C., diaminoethyl sulfide, which may be made by reacting ethylene imine with hydrogen sulfide, is miscible in all proportions with water and benzene; and is almost entirely immiscible with paraffin hydrocarbons. Diaminoethyl sulfide also is miscible with toluene and ethyl benzene, and is partially miscible with alkyl benzenes boiling within the range 150°–200° C. A three-stage batch countercurrent extraction at 25° C. of a mixture containing 40% of benzene and 60% of a mixture of hexanes and heptanes, with an equal volume of diaminoethyl sulfide, yielded an aromatic or extract fraction containing 76.5% of benzene and a raffinate containing 11% of benzene.

The extracted hydrocarbons may readily be separated from the solvents of the invention by distillation of the extract, preferably in the presence of steam and at temperatures not greatly exceeding 120° C. The hydrocarbons also may be recovered from said extract by addition of water, after which the solvent layer thus formed is isolated and is concentrated by distillation under subatmospheric pressure.

The following table indicates the comparative effectiveness of various extractants, including certain selective solvents of the present invention. The extraction index of comparison is based on a single-stage extraction at 25° C. of a mixture of toluene and aliphatic hydrocarbons boiling within the range 104°–114° C., and containing 50% of toluene.

The index=

$$\frac{y}{x} \frac{1-x}{1-y} \frac{y}{f} \frac{f-x}{y-x}$$

where $f$, $x$, and $y$ are, respectively, the toluene concentrations of the hydrocarbon content of the feed, raffinate and extract layers.

|  | Index |
|---|---|
| ββ′ diaminoethyl sulfide | 3.1 |
| β hydroxyethyl β′ aminoethyl sulfide | 2.2 |
| Diethylene triamine | 1.8 |
| Monoethanolamine | 1.8 |
| Diethylene glycol | 1.8 |
| Thiodiglycol | 1.7 |
|  | 1.0 |

The differences between the index values become greater when a plurality of separation stages is used in the extraction.

The following example will serve to illustrate the invention:

A mixture of benzene and cyclohexane containing 50% of each was introduced into a rectifying column packed with glass contact spirals, such as column 11, at a point about three-fifths the height of the column. Concurrently a stream of diaminoethyl sulfide was introduced into the top of the column and flowed countercurrent to the flow of hydrocarbon vapors, the solvent and extracted hydrocarbons flowing to the base of the column 11, at which point a temperature of 175° C. was maintained. The solvent and the hydrocarbon mixture were respectively introduced into the column in the ratio of 3 to 1 by volume; and the resultant distillate obtained by condensing the vapors leaving the column bore a ratio to the kettle product or raffinate of 2.4 to 1. The cooling coil 17 may be so operated, or a partial reflux condenser of other design may be so regulated, that a reflux ratio around 1 to 1 or less is secured, although reflux ratios as high as 4 to 1 or more may be less advantageously used. Seventy-four percent of the distillate was cyclohexane; while 95% of the hydrocarbons present in the kettle product was benzene.

The hydrocarbons were recovered from the kettle product by distillation, preferably conducted at temperatures no higher than 150° C., in the presence of steam.

In a similar distillation and countercurrent extraction operation for the separation of the aromatic and non-aromatic components of a mixture of petroleum hydrocarbons boiling within the range between 100° C. and 110° C. and containing 55% of aromatic hydrocarbons, the diaminoethyl sulfide used contained 3% of water, which served to reduce kettle temperature without loss of separating efficiency. A volume ratio of solvent feed to hydrocarbon mixture feed of 1.65 was used, with a kettle temperature of 136° C. Additional water amounting to 5% of the solvent used also was fed continuously to the kettle. The resultant distillate bore to the kettle product the volume ratio of 2.2. The distillate contained 33% of aromatic hydrocarbons; and the hydrocarbon components of the kettle product contained over 99% of aromatic hydrocarbons. The water that distilled over formed a separate layer in the distillate, and was readily eliminated.

For a hydrocarbon mixture having a given concentration of aromatic hydrocarbons there exists a solvent-to-hydrocarbon ratio beyond which additional solvent produces no further separation. Thus, in separating with diaminoethyl sulfide the aromatic constituents of a hydrocarbon mixture containing over 90% of toluene, the maximum solvent-to-hydrocarbon ratio is around 2 to 1; while the maximum solvent-to-hydrocarbon ratio is about 4 to 1 when the hydrocarbon mixture contains 50% of toluene; and the ratio is around 6 to 1 for hydrocarbon mixtures containing 10% of toluene.

The process is applicable for the separation of components of gaseous mixtures of saturated hydrocarbons and/or gaseous hydrocarbons of various degrees of chemical unsaturation, such as mixtures of butylenes and butadiene. Gaseous hydrocarbon mixtures containing olefines and paraffin hydrocarbons may have the olefines absorbed by contacting or extracting such a mixture with the selective solvents of the present invention.

It will thus be seen that the present invention involves the separation, from mixtures of hydrocarbons, and preferably from those mixtures having boiling ranges not greater than about 50° C., of hydrocarbons having different degrees of chemical unsaturation or of different structural configurations. The separation may be accomplished at room temperatures, or at temperatures either below or above room temperature. Preferably a countercurrent extraction of the hydrocarbon mixture with a liquid organic sulfide of the type hereindescribed is combined with a concurrent rectification of the hydrocarbon vapors in the presence of the solvent, and at a temperature below the boiling point of such solvent, but one at which both a liquid and a vapor hydrocarbon phase exist in the extraction and rectifying column.

The invention is susceptible of modification within the scope of the appended claims.

I claim:

1. Process for separating a mixture of hydrocarbons into its more paraffinic and more aromatic constituents, which comprises extracting the hydrocarbon mixture with an organic sulfide having a chemical structure designated by the formula

RSC$_2$H$_4$NH$_2$ wherein R designates a group selected from the class consisting of the aminoalkyl group, the hydroxyalkyl group and the aminoalkyl-substituted aminoalkyl groups.

2. Process for separating a hydrocarbon fraction into its more paraffinic and more aromatic constituents, which comprises extracting the hydrocarbon mixture with an aminoalkyl sulfide.

3. Process for separating a hydrocarbon fraction into its more paraffinic and more aromatic constituents, which comprises extracting the hydrocarbon mixture with a substituted aminoalkyl sulfide.

4. Process for separating a hydrocarbon fraction into its more paraffinic and more aromatic constituents, which comprises extracting the hydrocarbon mixture with an aminoethyl sulfide.

5. Process for separating a hydrocarbon fraction into its more paraffinic and more aromatic constituents, which comprises extracting the hydrocarbon mixture with diaminoethyl sulfide.

6. Process for separating a hydrocarbon fraction into its more paraffinic and more aromatic constituents, which comprises extracting the hydrocarbon mixture with aminoethyl hydroxyethyl sulfide.

7. Process for separating a hydrocarbon fraction into its more paraffinic and more aromatic constituents, which comprises extracting the hydrocarbon mixture with $\beta''$ aminoethyl ($\beta'$ iminoethyl) $\beta$ aminoethyl sulfide.

8. Process for separating a hydrocarbon mixture into portions respectively enriched in paraffinic and in non-paraffinic constituents of such mixture, which comprises extracting such mixture in at least on extraction stage with an open-chain substituted alkyl sulfide containing at least one NH$_2$CH$_2$CH$_2$S— group, said sulfide having a boiling point substantially higher than the boiling points of the non-paraffinic constituents of said mixture.

9. Process for separating a hydrocarbon mixture into portions respectively enriched in paraffinic and in non-paraffinic constituents of such mixture, which comprises extracting such mixture in at least one extraction stage with an open-chain substituted alkyl sulfide containing at least one NH$_2$CH$_2$CH$_2$S— group, said sulfide being substantially immiscible with said non-paraffinic hydrocarbons, and having a boiling point substantially higher than the boiling points of said non-paraffinic hydrocarbons, separating an extract fraction from a residual raffinate fraction, recovering from said extract fraction non-paraffinic hydrocarbons of said mixture, and recovering from said raffinate fraction paraffinic constituents of said mixture.

10. Process for separating paraffinic hydrocarbons from mixtures containing the same with non-paraffinic hydrocarbons, which comprises extracting such mixture with a high-boiling liquid solvent comprising a di-substituted alkyl sulfide containing at least one NH$_2$C$_2$H$_4$S— group, whereby the non-paraffinic hydrocarbons are concentrated in said solvent.

11. Process of separating paraffinic hydrocarbons from mixtures containing the same with non-paraffinic hydrocarbons and having a narrow boiling range, which comprises passing vapors of said hydrocarbon mixture in countercurrent contact with a liquid aminoethyl sulfide containing at least one NH$_2$C$_2$H$_4$S— group in the molecule while concurrently rectifying said vapors in the presence of said sulfide, separating and condensing the stripped vapors enriched in paraffinic hydrocarbons, and separately recovering a hydrocarbon mixture enriched in said non-paraffinic hydrocarbons from the residual solution thereof in said sulfide.

12. Process of separating paraffinic hydrocarbons from mixtures containing the same with non-paraffinic hydrocarbons and having a narrow boiling range, which comprises passing vapors of said hydrocarbon mixture in countercurrent contact with liquid diaminoethyl sulfide while concurrently rectifying said vapors in the presence of said sulfide, separating and condensing the stripped vapors enriched in paraffinic hydrocarbons, and separately recovering a hydrocarbon mixture enriched in said non-paraffinic hydrocarbons from the residual solution thereof in said sulfide.

13. Process of treating gaseous hydrocarbon mixtures containing saturated hydrocarbons and olefines for removing olefines contained therein, which comprises contacting such a gas mixture with an amino derivative of a substituted alkyl sulfide containing at least one $NH_2C_2H_4S$— group, to selectively absorb olefines in said sulfide, and removing absorbed olefines from said sulfide.

14. Process for separating a hydrocarbon mixture having a narrow boiling range into fractions enriched respectively in paraffinic and in non-paraffinic constituents of such mixture, which comprises passing vapors of said hydrocarbon mixture in countercurrent contact with a liquid aminoethyl sulfide containing at least one $NH_2C_2H_4S$— group in the molecule while concurrently rectifying said vapors in the presence of said sulfide, separating and condensing the stripped vapors enriched in paraffinic hydrocarbons, and separately recovering a hydrocarbon mixture enriched in said non-paraffinic hydrocarbons from the residual solution thereof in said sulfide.

15. Process for separating a hydrocarbon mixture having a narrow boiling range into fractions enriched respectively in paraffinic and in non-paraffinic constituents of such mixture, which comprises passing vapors of said hydrocarbon mixture in countercurrent contact with a liquid aminoethyl sulfide containing at least one $NH_2C_2H_4S$— group in the molecule, said sulfide being substantially free from mercaptans, while concurrently rectifying said vapors in the presence of said sulfide, separating and condensing the stripped vapors enriched in paraffinic hydrocarbons, and separately recovering from the residual solution thereof in said sulfide a hydrocarbon mixture enriched in said non-paraffinic hydrocarbons.

16. Process for separating a hydrocarbon mixture into portions respectively enriched in paraffinic and in non-paraffinic constituents of such mixture, which comprises extracting the mixture with an organic sulfide having at least one aminoalkyl group directly connected with a sulfur atom.

17. Process for separating paraffinic hydrocarbons from a mixture containing the same with non-paraffinic hydrocarbons, which comprises extracting such mixture with a high boiling solvent comprising a di-substituted alkyl sulfide containing at least one $NH_2C_2H_4S$— group, whereby the non-paraffinic hydrocarbons are concentrated in said solvent.

18. Process for separating a hydrocarbon mixture into portions respectively enriched in the paraffinic and in non-paraffinic constituents of such mixture, which comprises rectifying vapors of such mixture while passing such vapors in countercurrent contact with a liquid open-chain substituted alkyl sulfide containing at least one $NH_2CH_2CH_2S$— group, said sulfide having a boiling point substantially higher than the boiling points of the non-paraffinic constituents of said mixture.

19. Process for separating a mixture of hydrocarbons into portions respectively enriched in the chemically more unsaturated constituents and in the chemically less unsaturated or saturated constituents of such mixtures, which comprises extracting the hydrocarbon mixture with an organic sulfide having a chemical structure designated by the formula $RSC_2H_4NH_2$ wherein R designates a group selected from the class consisting of the aminoalkyl groups, the hydroxyalkyl groups and the aminoalkyl-substituted aminoalkyl groups.

20. Process for separating a hydrocarbon fraction into portions respectively enriched in the chemically more unsaturated constituents and in the chemically less unsaturated or saturated constituents of such mixture, which comprises extracting the hydrocarbon mixture with an aminoalkyl sulfide.

21. Process for separating a hydrocarbon mixture into portions respectively enriched in the chemically more unsaturated constituents and in the chemically less unsaturated or saturated constituents of such mixture, which comprises passing vapors of said hydrocarbon mixture in countercurrent contact with a liquid aminoethyl sulfide containing at least one $NH_2C_2H_4S$— group in the molecule, rectifying said vapors in the presence of said sulfide, separating and condensing the stripped vapors enriched in the chemically less unsaturated or saturated constituents of such mixture, and separately recovering a hydrocarbon mixture enriched in said more unsaturated constituents from the residual solution thereof in said sulfide.

22. Process for separating a mixture of gaseous hydrocarbons into portions respectively enriched in the chemically more unsaturated constituents and in the chemically less unsaturated or saturated constituents of such mixture, which comprises contacting such a gaseous mixture with an organic sulfide to selectively absorb the chemically more unsaturated constituents of said mixture, and removing the absorbed constituents from the sulfide, said sulfide having a chemical structure designated by the formula:

$$RSC_2H_4NH_2$$

wherein R designates a group selected from the class consisting of the aminoalkyl groups, the hydroxyalkyl groups and the aminoalkyl-substituted aminoalkyl groups.

ALEXANDER LOGAN WILSON.